United States Patent [19]

Herrington et al.

[11] Patent Number: 5,010,117

[45] Date of Patent: Apr. 23, 1991

[54] FLEXIBLE POLYURETHANE FOAMS PREPARED USING LOW UNSATURATION POLYETHER POLYOLS

[75] Inventors: Ronald M. Herrington, Brazoria; Robert B. Turner, Lake Jackson, both of Tex.; Roney J. Matijega, Midland, Mich.

[73] Assignee: Dow Chemical Company, Midland, Mich.

[21] Appl. No.: 367,279

[22] Filed: Jun. 16, 1989

[51] Int. Cl.$^5$ .............................................. C08G 18/14
[52] U.S. Cl. .................................... 521/159; 521/137; 521/163; 521/167; 521/174
[58] Field of Search ............... 521/159, 174, 137, 167, 521/163

[56] References Cited

U.S. PATENT DOCUMENTS 3,405,077 10/1968 Pastor et al. ......................... 521/174
3,432,448 3/1969 Sambeth et al. ..................... 521/174

Primary Examiner—Maurice J. Welsh

[57] ABSTRACT

Flexible polyurethane foams are prepared from poly(-propylene oxide) polymers having low levels of monofunctional impurities. The resulting foam has improved processing characteristics and compression set.

15 Claims, No Drawings

FLEXIBLE POLYURETHANE FOAMS PREPARED USING LOW UNSATURATION POLYETHER POLYOLS

BACKGROUND OF THE INVENTION

This invention relates to flexible polyurethane foam, and particularly to flexible polyurethane foam prepared from a relatively high equivalent weight polymer of propylene oxide.

It is well-known to prepare flexible polyurethane foam by reacting a polyether polyol with a polyisocyanate in the presence of a blowing agent. The polyether polyols most commonly used for this purpose are polymers and copolymers of propylene oxide. Polyurethane foams prepared from these poly(propylene oxide) polymers have many excellent properties, and thus are made and used in very substantial quantities.

It would, however, be desirable to improve certain aspects of these foams. For example, foams prepared from poly(propylene oxide) polymers often lack "green strength", i.e., adequate physical strength after initial curing. This property is quite important upon demolding the article, since its ultimate physical properties usually do not develop until several days after its production. Nonetheless, it is usually necessary to handle the foam immediately after its preparation. For example, it is usually necessary to move the foam to a storage, packout or shipping area, or to fabricate the foam for a particular application. In the case of molded foam, it is necessary to demold the foam so the mold can be re-used. During these operations, the foam must have sufficient strength to withstand a significant amount of handling without tearing, becoming distorted or sustaining non-recoverable blemishes.

In addition, these foams quite often have high "compression sets". Compression set is a measure of how well a foam recovers its initial dimensions when compressed. Ideally, flexible foam should regain essentially its original dimensions after being compressed. In practice, however, foam prepared from poly(propylene oxide) polymers tend to lose from about 5 to about 50% or more of their uncompressed height during standard tests for compression set.

Resolution of these problems is made more difficult because modifications which tend to ameliorate one of these problems usually exacerbate other important foam properties. For example, green strength can often be improved by increasing the reactivity of the poly(propylene oxide) polymer through ethylene oxide endcaps. However, increasing the ethylene oxide content of the polymer increases the foam's sensitivity to moisture, which in turn often causes greater compression sets.

It would be desirable to provide a means whereby flexible polyurethane foam could be prepared with better processing characteristics and improved physical properties, particularly improved compression set.

SUMMARY OF THE INVENTION

In one aspect, this invention is a flexible molded or high resiliency foam which is the reaction product of a reaction mixture comprising a polyisocyanate, an effective amount of a blowing agent and a poly(propylene oxide) polymer having an average nominal functionality from about 2 to about 6, an equivalent weight from about 1000 to about 2000 and a monol content of about 0.04 milliequivalents per gram of polymer (meq/g) or less.

In another aspect, this invention is an improvement in a process for preparing a molded or high resiliency polyurethane foam wherein a polyisocyanate and a poly(propylene oxide) polymer are reacted in the presence of an effective amount of a blowing agent, the improvement which comprises using a poly(propylene oxide) polymer having an average nominal functionality from about 2 to about 6, an equivalent weight from about 1000 to about 2000 and a monol content of about 0.04 meq/g or less.

It has unexpectedly been found that when a poly(propylene oxide) polymer having a low monol content is used to make flexible polyurethane foam, significant improvements in green strength and compression set are obtained. In addition, these gains are made without the loss of other desirable properties, so the foam of this invention can be used in the same manner and for the same purposes as conventional foam.

DETAILED DESCRIPTION OF THE INVENTION

The foam of this invention is characterized by the use of poly(propylene oxide) polymers having low monol concentration. Poly(propylene oxide) polymers are prepared by the catalyzed, thermally induced polymerization of propylene oxide (PO) in the presence of an initiator compound as described below. Under the conditions of its polymerization, PO undergoes an isomerization reaction to form allyl alcohol. Allyl alcohol can then react with additional PO to form a monofunctional polyether having one hydroxyl group and a terminal allyl ether group. In addition, some of these allyl ether groups can rearrange under certain conditions to form terminal propenyl unsaturation.

These monofunctional polyether impurities are believed to react with polyisocyanates during the preparation of polyurethane foam, terminating the growing polymer chains and therefore limiting the buildup of polymer molecular weight.

Because each monofunctional molecule contains an unsaturated terminal group, the presence of these species can be determined by measuring the quantity of the unsaturation. Measurement of this terminal unsaturation can be done by titration with mercuric acetate, as described in "Testing Urethane Foam Polyol Raw Materials", American Society for Testing and Materials, ASTM D-2849-69.

In this invention, the poly(propylene oxide) polymer is characterized by having less than about 0.04, preferably about 0.01 to about 0.039, more preferably about 0.01 to about 0.03, most preferably about 0.01 to about 0.025, milliequivalents of monofunctional impurities (terminal unsaturation) per gram of polymer.

In this invention, the term poly(propylene oxide) polymer refers to a homopolymer of propylene oxide or a copolymer thereof with a copolymerizable alkylene oxide. Suitable copolymers of propylene oxide include random and block copolymers thereof with $C_2$-$C_6$ alkylene oxides such as ethylene oxide, 1,2- or 2,3-butylene oxide, the various isomers of hexylene oxide, and the like. Among these other alkylene oxides, ethylene oxide and the isomers of butylene oxide are preferred, with ethylene oxide being particularly preferred due to its reactivity and because it can be used to introduce primary hydroxyl groups to the polymer, thereby increasing its reactivity with a polyisocyanate. When the propylene oxide is copolymerized, it constitutes the major portion of the weight of the alkylene oxides. When the propylene oxide is randomly copolymerized with another alkylene oxide, the propylene oxide preferably constitutes at least about 60, more preferably at least about 70, most preferably at least about 80 percent of the weight of the copolymerized alkylene oxides. Such random copolymers can also have terminal blocks of a different alkylene oxide, particularly ethylene oxide, but such terminal blocks preferably do not constitute more than about 30, more preferably not more than 20 weight percent of the polyether. Among the random copolymers of propylene oxide, 1000–2000 equivalent weight, nominally 2–3 functional copolymers of a mixture of about 70–95 weight percent propylene oxide and 5 to about 30 weight percent ethylene oxide, optionally having terminal poly(ethylene oxide) blocks constituting about 10 to about 20 weight percent of the polyether, are most preferred.

When a block copolymer of poly(propylene oxide) and another alkylene oxide is used, the oxypropylene content thereof is preferably at least about 60 weight percent, more preferably at least about 70 weight percent and most preferably at least about 80 weight percent. The other alkylene oxide used is preferably ethylene oxide, which is most preferably present in the form of terminal poly(oxyethylene) blocks. Among these, the most preferred polyether is a poly(propylene oxide) having an equivalent weight from about 1000 to about 2000 and a nominal functionality from about 2 to about 3, which contains terminal poly(ethylene oxide) blocks constituting about 10 to about 20 weight percent of the polyether.

Mixtures of these poly(propylene oxide) polymers can be used if desired. When mixtures are used, the mixture advantageously has a level of unsaturation, equivalent weight and functionality as described before.

The term "nominal functionality" is used herein to designate the number of active hydrogen atoms on the initiator compound used in preparing the poly(propylene oxide) polymer. The poly(propylene oxide) polymer, absent impurities, normally has a number of active hydrogen-containing groups per molecule equal to the number of active hydrogen atoms on the initiator. In the polymerization of alkylene oxides, terminal hydroxyl groups are formed. These hydroxyl-terminated poly(-propylene oxide) polymers are useful and generally preferred on the basis of cost and availability. However, it is possible to convert all or part of the terminal hydroxyl groups to certain amine groups, and use the resulting aminated polyethers to make foam, as described in copending application of Herrington et al., Ser. No. 170,971, filed Mar. 21, 1988, incorporated herein by reference.

The poly(propylene oxide) may contain dispersed polymer particles such as polyurea, polyurethane, polyurethane-urea particles, as well as particles of a vinyl addition polymer or copolymer such as polystyrene, polyacrylonitrile or polystyrene-co-acrylonitrile particles, or particles of a cured epoxy resin. When such dispersions are used, the equivalent weight and monol content are calculated for the purpose of this invention on a neat basis, i.e. as though the dispersed polymer particles were absent. Suitable such "polymer polyols" are disclosed, for example, in U.S. Pat. Nos. 4,581,418, 4,460,715, 3,953,393, 4,374,209 and 4,324,716.

The poly(propylene oxide) polymer is advantageously prepared in the base-catalyzed polymerization of a propylene oxide or mixture thereof with another alkylene oxide in the presence of an initiator compound. The initiator compound has a plurality of active hydrogen atoms per molecule, which corresponds to the nominal functionality of the resulting poly(propylene oxide) polymer. The initiator compound is also advantageously of relatively low molecular weight and preferably has a molecular weight from about 17 to about 1000, more preferably about 31 to about 400, more preferably about 31 to about 250. Suitable initiator compounds include water, ethylene glycol, diethylene glycol, propylene glycol, dipropylene glycol, tripropylene glycol, glycerine, trimethylolpropane, pentaerythritol, sucrose, sorbitol, ammonia, monoethanolamine, diethanolamine, triethanolamine, aminoethylethanolamine, ethylenediamine, diethylenetriamine, low equivalent weight polyethers, and the like.

The initiator is contacted with the propylene oxide (and other alkylene oxides, if any) at elevated temperatures in the presence of a basic catalyst. Such processes are described, for example, in U.S. Pat. Nos. 3,393,243 and 4,595,743, incorporated herein by reference. Suitable catalysts, include alkali metal hydroxides and alkoxides, alkaline earth carboxylates, certain tertiary amine compounds and the like as described in the foregoing patents. Generally, potassium hydroxide is the catalyst of choice. However, the choice of catalyst and/or reaction conditions does have an effect on the level of monol impurities formed. Generally, mild conditions, such as the use of temperatures from about 50 to about 120° C., and lower concentrations of catalyst, tend to minimize the isomerization of propylene oxide to monoalcohols. In addition, in some instances the choice of catalyst has been shown to produce lower levels of unsaturated impurities. See, for example, the copending application of Heuvelsland, Ser. No. 273,375, filed Nov. 18, 1988, incorporated herein by reference, wherein the use of barium hydroxide as a catalyst for PO polymerizations is shown to provide low monol-containing products.

Either aliphatic or aromatic polyisocyanates can be used in this invention to make foam. Suitable aliphatic polyisocyanates include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate, 1,5-diisocyanato-3,3,5-trimethylcyclohexane, 2,4- and/or 2,6-hexahydrotoluene diisocyanate, perhydro-2,4'- and/or -4,4'-diphenylmethanediisocyanate ($H_{12}MDI$), isophorone diisocyanate, mixtures thereof and the like.

Suitable aromatic polyisocyanates include, for example, 2,4- and/or 2,6-toluene diisocyanate (TDI), 2,4'-diphenylmethane diisocyanate (MDI), 1,3- and 1,4-phenylene diisocyanate, 4,4'-diphenylmethane diisocyanate (including mixtures thereof with minor quantities of the 2,4'-isomer), 1,5-naphthylene diisocyanate, triphenylmethane-4,4',4"-triisocyanate, polyphenylpolymethylene polyisocyanates, mixtures thereof and the like.

In addition, derivatives and prepolymers of the foregoing polyisocyanates such as those containing urethane, carbodiimide, allophanate, isocyanurate, acylated urea, biuret, ester and similar groups are useful herein. Of these, prepolymers of TDI and MDI, and the so-called "liquid MDI" products which contain carbodiimide groups and have an equivalent weight of about 130–150 are of particular significance.

Of the foregoing polyisocyanates, TDI, MDI, isophorone diisocyanate, $H_{12}$MDI, hexamethylene diisocyanate, cyclohexane diisocyanate their derivatives and mixtures thereof are preferred due to their cost, commercial availability and performance. TDI, MDI and derivatives of MDI are more preferred. TDI, particularly mixtures of the 2,4- and 2,6- isomers, is especially preferred.

The polyisocyanate is used in an amount sufficient to provide an isocyanate index of about 60-200, preferably about 90-125, more preferably about 95-110. At higher indices, trimerization of the polyisocyanate often occurs, causing the foam to lose flexibility. At lower indices, insufficient curing occurs, causing the foam to have poor properties. The "isocyanate index" is 100 times the ratio of isocyanate groups to active hydrogen-containing groups contained in the mixture which reacts to form the foam.

A blowing agent is another critical component of the invention. The blowing agent is any material which is capable of generating a gas under the conditions of the reaction of a polyisocyanate and the poly(propylene oxide) polymer. Such materials include air, carbon dioxide, nitrogen, water, formic acid, low-boiling halogenated alkanes, finely divided solids, the so-called "azo" blowing agents such as azobis(formamide) and the like. Preferred are water, the low-boiling halogenated alkanes, or mixtures thereof. Blowing agents are advantageously employed in a quantity sufficient to provide the foam with a bulk density from about 0.5, preferably about 0.9, more preferably about 1.1 to about 6 or less, preferably about 4, more preferably about 3 pounds per cubic foot. The halogenated alkanes, including methylene chloride, dichlorodifluoromethane, monochlorodifluoromethane, monochlorotrifluoromethane and the like, generally provide the desired density when employed in amounts from about 5 to about 50 parts per 100 parts poly(propylene oxide) polymer. Lesser amounts are useful when employed in conjunction with another blowing agent, such as water. Water provides a desirable density when used in an amount from about 0.5, preferably about 3.5, more preferably about 4, to about 10, preferably about 8, more preferably 6, parts per 100 parts poly(propylene oxide) polymer.

A catalyst for the reaction of the poly(propylene oxide) polymer and the polyisocyanate is also used in making foam according to this invention. Although a wide variety of materials are known to be useful for this purpose, the most widely used and preferred catalysts are the tertiary amine catalysts and the organometallic catalysts.

Exemplary tertiary amine catalysts, include, for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropylamine, N,N-diethyl-3-diethylaminopropylamine, dimethylbenzyl amine, bis(2-dimethylaminoethyl)ether, and the like. Tertiary amine catalysts are advantageously employed in an amount from about 0.01 to about 5, preferably about 0.05 to about 2 parts per 100 parts by weight of the propylene oxide polymer.

Exemplary organometallic catalysts include organic salts of metals such as tin, bismuth, iron, mercury, zinc, lead and the like, with the organotin compounds being preferred. Suitable organotin catalysts include dimethyltindilaurate, dibutyltindilaurate, stannous octoate and the like. Other suitable catalysts are taught, for example, in U.S. Pat. No. 2,846,408. Advantageously, about 0.001 to about 0.5 part by weight of an organometallic catalyst is used per 100 parts of propylene oxide polymer.

Foam is prepared according to this invention by contacting the poly(propylene oxide) polymer, blowing agent, polyisocyanate and catalyst together under conditions such that the components react to form a cellular polymer. Generally, the reaction mixture may contain additional components such as crosslinkers, catalysts, surfactants, colorants, cell openers, flame retardants, antioxidants, mold release agents, UV stabilizers and the like, which may vary according to the desired attributes of the foam, and whether the foam is a molded or slabstock foam.

Crosslinkers and chain extenders may be used, particularly in making molded foam or high resiliency slabstock foam, in order to improve load-bearing and processing. Suitable such crosslinkers include alkanolamines and other compounds of about 200 or lower equivalent weight having about 3-8, preferably about 3-4 active hydrogen-containing groups per molecule. Exemplary such compounds are glycerine and trimethylolpropane, alkoxylated derivatives thereof, as well as other alkylene triols. Preferred, however, are alkanolamines such as diethanolamine, triisopropanolamine, triethanolamine, diisopropanolamine, adducts of 4-8 moles of ethylene oxide and/or propylene oxide with ethylene diamine and the like, and polyamines such as methylene bis(o-chloroaniline), ethylenediamine, ammonia and the like. Most preferred, on the basis of its optimum reactivity, is diethanolamine. "Chain extenders", for the purposes of this invention, are compounds having two active hydrogen-containing groups per molecule and an equivalent weight from about 31 to about 300, preferably about 31 to about 150. Hydroxyl-containing chain extenders include the alkylene glycols and glycol ethers such as ethylene glycol, 1,3-propylene glycol, 1,4-butylene glycol, 1,6-hexamethylene glycol, diethylene glycol, triethylene glycol, dipropylene glycol, tripropylene glycol, 1,4-cyclohexanedimethanol, alkoxylated aniline and the like. Amine chain extenders include diethyltoluene diamine, phenylene diamine, methylene bis(o-chloroaniline), NaCl blocked methylene bis(aniline), toluene diamine, aromatic diamines which are substituted at at least one of the carbon atoms adjacent to the amine groups with a lower alkyl group, and the like. Such chain extenders and crosslinkers, when used, are advantageously employed in a minor amount, i.e., less than about 5 parts by weight per 100 parts by weight poly(propylene oxide) polymer. Most preferably, the combined weight of chain extender and crosslinker is less than about 20, preferably less than about 5 parts by weight per 100 parts by weight poly(propylene oxide) polymer.

In order to make a stable foam, i.e., one which does not collapse or contain significant quantities of large pores, a surfactant which stabilizes the foaming reaction mixture against collapse until the mixture is sufficiently cured to maintain its configuration may be used. Suitable surfactants include siloxane/poly(alkylene oxide) copolymers as described, for example, in U.S. Pat. Nos. 3,887,500 and 3,957,842. The selection and use of such surfactants in preparing foams is well-known in the art. Accordingly, it is preferred to use a surfactant in an amount less than about 5, preferably less than about 2 parts per 100 parts of propylene oxide polymer.

According to this invention, foam is prepared in a one-shot process by mixing all reactive components, catalysts, and optional ingredients and permitting same to react. The benefits of this invention are particularly seen in the preparation of molded foam. In preparing molded foam, all components except the polyisocyanate are advantageously blended together and fed as a single stream into a mixing head. However, certain components such as halogenated methane blowing agents are sometimes blended with the polyisocyanate. In addition, separate water, polyol, surfactant, etc. streams can be introduced on demand, if desired. The polyisocyanate is added to the mixing head as a separate stream where it is mixed with the polyol mixture and injected into the mold. In performing the mixing and mold filling steps, conventional, low pressure apparatus can be used, or high pressure impingement mixing processes, such as a reaction injection molding process, can be used. Generally, the components are mixed at approximately room temperature, although components such as pure MDI which are solid at room temperature may be heated above their melting points.

In one molding technique (hot molding process), the reactants are placed into a mold which is near ambient temperature. After filling, the mold is placed into an oven at a temperature of about 150° C. to about 300° C. to effect curing. In a second technique (cold molding process), the reactants are placed into a mold which is preheated to about 30° C. to about 75° C. After the mold is filled, it is placed in a 70° C.-200° C. oven to effect cure. In a third technique, the filled mold is maintained at ambient temperature during the curing process. In this third technique, the mold may or may not be preheated, although it preferably is to prevent heat sink effects.

A sufficient amount of the reaction mixture is placed into the mold so that, after expansion, the mixture completely fills the mold. Advantageously, a small excess of material is added over that minimally required to fill the mold. After filling the mold, the reaction mixture is permitted to cure in the mold at least to a state which permits the molded foam to be removed from the mold without permanent undesired distortion. In typical commercial procedures, an in-mold cure time of about 2 to about 30, preferably about 2 to about 15 minutes is adequate for this purpose. If required, the foam can be postcured by heating to about 50° C. to about 120° C. for a period of about 10 minutes to about 24 hours, preferably about 20 minutes to about 2 hours.

It may be necessary or desirable to mechanically open the cells of the foam during or after cure. This can be done by crushing the foam, puncturing the foam, vacuum crushing the foam, or by releasing the pressure in the mold at a proper stage of cure as taught in U.S. Pat. No. 4,579,700, incorporated herein by reference.

In making the less preferred high resiliency slabstock foam, the reaction mixture also advantageously contains a surfactant and catalyst as described before. "High resiliency" slabstock foams are generally distinguished from conventional slabstock foam in their use of primary hydroxyl-terminated and higher equivalent weight polyols. Because of their higher reactivity and the use of higher equivalent weight polyethers, processing characteristics of these formulations are much more significant than in conventional slabstock foam. Crosslinkers, although they may be used, are often omitted from slabstock formulations. In the commercial production of slabstock foam, the components can be and typically are introduced individually to a mixing head where they are thoroughly blended and metered onto a bed where foaming takes place. However, preblending of the components, except for the polyisocyanate, can be done if desired. The components are advantageously at room temperature or a slightly elevated temperature when blended in the mixing head, although preheating may be necessary in some instances to melt components which are solid at room temperature.

The foam of this invention is useful, for example, as bedding, furniture cushioning, padding, carpet underlayment, attached cushion carpet backing, automobile head rests, crash pads, arm rests, console covers, head liners, seating and the like. This invention is particularly useful in applications wherein good load-bearing characteristics are desired or where good processing, particularly short in-mold curing times, are desired.

The following example is provided to illustrate the invention, but is not intended to limit the scope thereof. All parts and percentages are by weight unless otherwise indicated.

EXAMPLE 1

In this example, a low monol polyether polyol is spiked with varying amounts of a monofunctional poly(propylene oxide) to simulate polyether polyols of increasing monol content. The low monol polyether polyol is a glycerine-initiated poly(propylene oxide) which is end-capped with 18.5% ethylene oxide. It contains 85% primary hydroxyl groups and has an equivalent weight of 1747. Its monol content, as indicated by its unsaturation, it 0.027 meq/g. This polyol is referred to herein as Polyol A.

A portion of Polyol A is used to prepare a copolymer polyol containing about 25% dispersed styrene/acrylonitrile copolymer particles (70/30 S/AN ratio), according to the general process described in U.S. Pat. No. 4,394,491. Average particle size is about 6500 Angstroms. This product is referred to herein as Copolymer Polyol A.

The monofunctional poly(propylene oxide) is a 523 equivalent weight, n-butanol-initiated propylene oxide/ethylene oxide copolymer containing 55% oxyethylene units and having 88% primary hydroxyl groups. This relatively low equivalent weight monofunctional polymer is chosen because monofunctional impurities in poly(propylene oxide) polymers normally have a much lower equivalent weight than the poly(propylene oxide) as a whole.

A "B-side" formulation is prepared by blending 50 parts by weight Polyol A, 50 parts Copolymer Polyol A, 1.65 parts silicone surfactant, 1.7 parts diethanolamine, 3.8 parts water and 0.44 parts catalysts. Foam made using this formulation is referred to herein as Sample No. 1. The poly(propylene oxide) polymer in this formulation has an average monol content of 0.027 meq/g. A portion of this formulation is reacted with a 80/20 mixture of 2,4- and 2,6-toluene diisocyanate using a low pressure mixing machine. The component are at about 75° C. when contacted. The resulting reaction mixture is dispensed into 15"×15"×4.5", 140° C. mold and cured for two minutes at room temperature, after which the mold is placed in a 250° F. oven for 4 minutes. After demolding, the foam samples are thoroughly crushed to open the cell windows. Foam samples are prepared at 100 and 105 index, with physical properties measured at each index. The average of the values obtained at the two indices are reported in Table 1 following. Foams for cure testing are prepared in a 15"×30"×"' mold in a manner as described above.

For comparison, additional foam samples are made with a like "B-side" formulation, except that sufficient of the Polyol A is replace with the monofunctional poly(propylene oxide) that the average monol content of the polyethers is 0.06 meq/g (Comparative Sample A). Physical properties are determined as for Sample 1, and are as reported in Table 1.

Additional foam samples are made, this time using a "B-side" formulation containing sufficient of the monofunctional poly(propylene oxide) that the average monol content of the polyethers is 0.09 meq/g. The physical properties are determined and reported in Table 1.

Cure ratings are determined by impressing each of four replicate, foam samples of with a jig containing four indenter feet to regionally deflect the foam to 1", ¾", ½", and ¼" residual thickness. The samples are so impressed for periods of 15, 30, 45 and 60 seconds, respectively. The jig is then removed and the percentage loss of foam height is measured at each point of deflection. This data is fitted into the following form.

| Deflection | Deflection to: | | | |
|---|---|---|---|---|
| Time (sec) | 1" | ¾" | ½" | ¼" |
| 15 | A | B | C | D |
| 30 | E | F | G | H |
| 45 | I | J | K | L |
| 60 | M | N | O | P |

The surface cure rating is calculated by adding A+B+C+D+E+F+G+I+J+M. The core cure rating is calculated by adding H+K+L+N+O+P. Since smaller losses in form height are desired, small cure ratings indicate superior results.

TABLE 1

| | Sample or Comp. Sample No. | | |
|---|---|---|---|
| Property | 1 | A* | B* |
| Polyether unsaturation[1] | 0.027 | 0.06 | 0.09 |
| Surface Cure Rating[2] | 39 | 60 | 71 |
| Core Cure Rating[2] | 137 | 193 | 212 |
| Density, pcf[3] | 2.07 | 2.09 | 2.09 |
| Tensile Strength, psi[3] | 24.8 | 25.0 | 25.0 |
| Elongation, % at break[3] | 165 | 175 | 175 |
| Tear Strength, lb/in[3] | 1.65 | 1.70 | 1.80 |
| Compression Set, 75%[3] | 20.9 | 23.1 | 29.3 |
| HACS 50%[3] | 28.5 | 47.8 | 52.8 |
| HACS, 75%[3] | 34.5 | 57.8 | 61.1 |
| 25% ILD[3] | 30.8 | 30.3 | 30.3 |
| 65% ILD[3] | 84.5 | 84.0 | 83.1 |

*Not an example of this invention.
[1]In meq/g, determined by mercuric acetate titration.
[2]See accompanying text. Smaller numbers indicate superior results.
[3]ASTM D-3574-81. HACS is humid aged compression set. ILD is indentation load deflection.

As can be seen from the data in Table 1, the Foam Sample of this invention has, with two exceptions, properties generally comparable to those of the Comparative Samples. The exceptions are the cure rating and compression set data, wherein Sample No. 1 is decidedly superior to either of the Comparatives (higher cure ratings indicate worse cure properties).

EXAMPLE 2

Foam Sample Nos. 2-4 and Comparative Sample C are made using the general procedure described in Example 1, except that Polyol A and the polyol portion of Copolymer Polyol A are replaced with a nominal triol differing from Polyol A in that the ethylene oxide cap constitutes only 14% of the polyol. The amount of monol is varied so that the level thereof is as indicated in Table 2 following. All foams are nominally 2.0 pcf in density. The properties of the resulting foams are evaluated, and are as reported in Table 2. Again, inferior cure and compression sets are obtained as the unsaturation level rises. The improvement in core cure rating between Samples 2,3 and 4 further show significant cure improvement as the monol concentration decreases.

TABLE 2

| | Sample or Comp. Sample No. | | | |
|---|---|---|---|---|
| Property | 2 | 3 | 4 | C* |
| Polyether unsaturation[1] | 0.029 | 0.032 | 0.040 | 0.060 |
| Surface Cure Rating[2] | 123 | 103 | 103 | 107 |
| Core Cure Rating[2] | 182 | 192 | 212 | 216 |
| Tensile Strength, psi[3] | 23.1 | 23.3 | 23.4 | 23.1 |
| Elongation, % at break[3] | 148 | 147 | 152 | 149 |
| Tear Strength, lb/in[3] | 1.36 | 1.39 | 1.61 | 1.44 |
| Compression Set, 75%[3] | 14.5 | 14.3 | 15.2 | 14.7 |
| 6 hour HACS 50%[3] | 23.5 | 25.6 | 25.6 | 28.5 |
| 3 hour HACS, 75%[3] | 20.2 | 23.3 | 21.7 | 22.5 |
| 25% ILD[3] | 25 | 24 | 24 | 24 |
| 65% ILD[3] | 73 | 71 | 71 | 71 |

*Not an example of this invention.
[1]In meq/g, determined by mercuric acetate titration.
[2]See accompanying test. Smaller numbers indicate superior results.
[3]ASTM D-3574-81.

EXAMPLE 3

Example 2 is repeated, except 4.2 parts water are used and the amount of polyisocyanate is adjusted accordingly. Sample No. 5 has 0.032 moles of unsaturation/gram of polyether, whereas Comparative Sample D has 0.06 moles thereof/gram of polyether. The foams are nominally 1.8 pcf in density. Results are as indicated in Table 3 following. In this lower density formulation, the effects of monol concentration on cure and compression sets are very prominent.

TABLE 3

| | Sample or Comp. Sample No. | |
|---|---|---|
| Property | 5 | D* |
| Polyether unsaturation[1] | 0.032 | 0.060 |
| Surface Cure Rating[2] | 98 | 173 |
| Core Cure Rating[2] | 130 | 198 |
| Tensile Strength, psi[3] | 22.0 | 21.8 |
| Elongation, % at break[3] | 147 | 145 |
| Tear Strength, lb/in[3] | 1.45 | 1.44 |
| Compression Set, 75%[3] | 17.5 | 20.5 |
| 6 hour HACS 50%[3] | 38.1 | 41.0 |
| 3 hour HACS, 75%[3] | 31.9 | 39.8 |
| 25% ILD[3] | 22 | 22 |
| 65% ILD[3] | 66 | 66 |

*Not an example of this invention.
[1]In meq/g, determined by mercuric acetate titration.
[2]See accompanying text. Smaller numbers indicate superior results.
[3]ASTM D-3574-81.

What is claimed is:

1. A flexible molded or high resiliency slabstock foam which is the reaction product of a reaction mixture comprising a polyisocyanate, an effective amount of a blowing agent and a poly(propylene oxide) polymer having an average nominal functionality from about 2 to about 6, an equivalent weight from about 1000 to about 2000 and a monol content of about 0.04 meq/g or less.

2. The foam of claim 1 wherein the poly(propylene oxide) polymer has terminal hydroxyl groups.

3. The foam of claim 2 wherein the poly(propylene oxide) polymer is a block copolymer prepared by the sequential addition of propylene oxide and ethylene oxide to a polyhydric initiator.

4. The foam of claim 3 wherein the poly(propylene oxide) polymer contains about 10 to about 20 weight percent oxyethylene units and has a nominal functionality from about 2 to about 4.

5. The foam of claim 4 wherein the poly(propylene oxide) polymer has an equivalent weight from about 1300 to about 1800.

6. The foam of claim 3 wherein the monol content is from about 0.01 to about 0.039.

7. The foam of claim 5 wherein the monol content is from about 0.01 to about 0.039.

8. The foam of claim 7 wherein the monol content is from about 0.01 to about 0.03.

9. The foam of claim 6 wherein the monol content is from about 0.01 to about 0.03.

10. The foam of claim 2 wherein the blowing agent comprises water.

11. The foam of claim 1 wherein the poly(propylene oxide) polymer has terminal primary or secondary amine groups.

12. The foam of claim 11 wherein the terminal amine groups are aliphatically bound.

13. The foam of claim 11 wherein the terminal amine groups are aromatically bound.

14. The foam of claim 11 wherein the blowing agent comprises water.

15. In a process for preparing a molded or high resiliency slabstock polyurethane foam wherein a polyisocyanate and a poly(propylene oxide) polymer are reacted in a closed mold in the presence of an effective amount of a blowing agent, the improvement comprising using as said poly(propylene oxide) polymer a poly(propylene oxide) having an average nominal functionality from about 2 to about 6, an equivalent weight from about 1000 to about 2000 and a monol content of about 0.04 meq/g or less.

* * * * *